F. B. HORN & A. WAGNER.
SHEET METAL WHEEL.
APPLICATION FILED JUNE 15, 1911.
1,078,581. Patented Nov. 11, 1913.
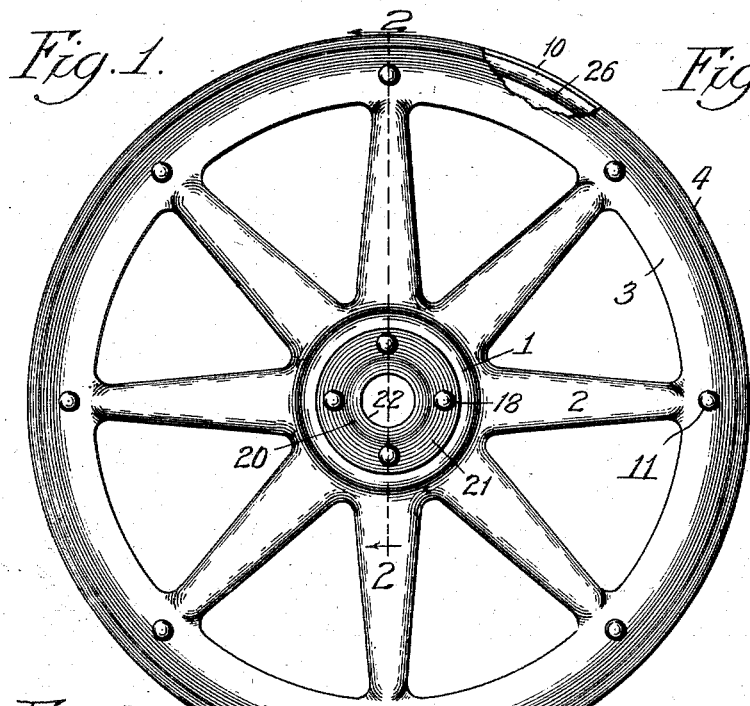
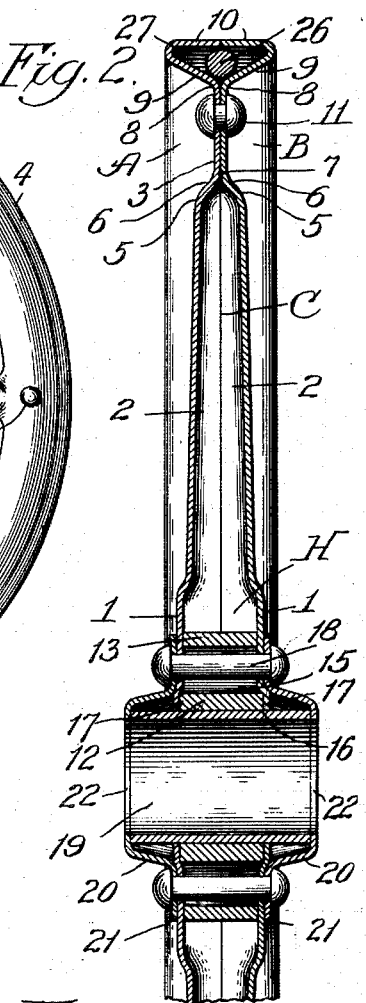
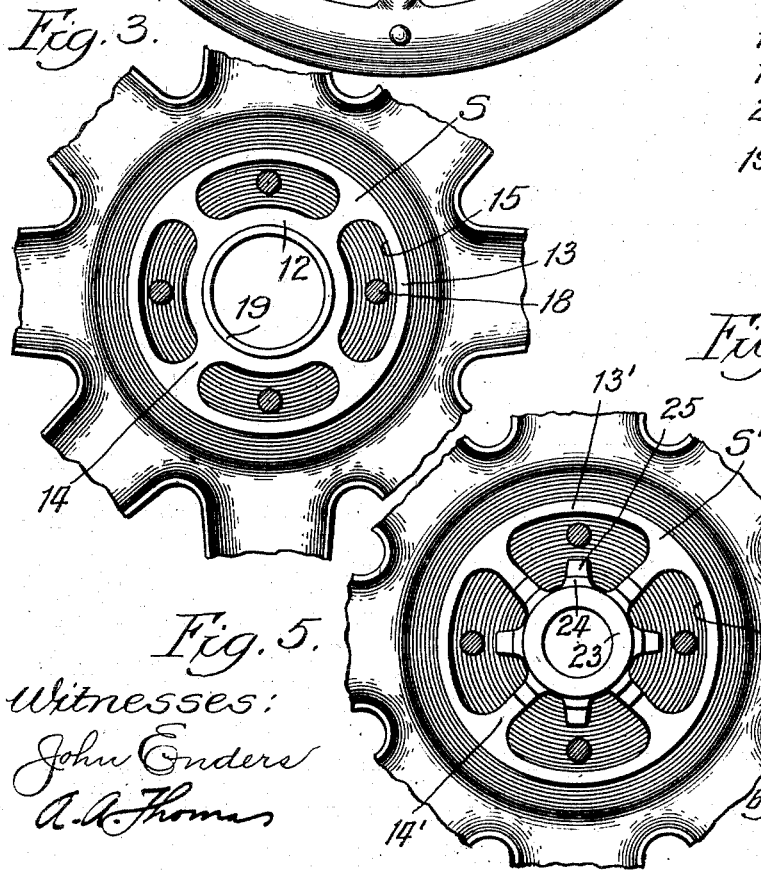
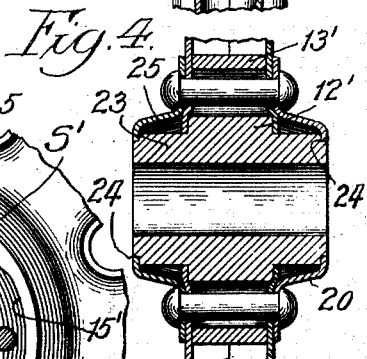
Witnesses:
John Enders
A. A. Thomas
Inventors:
Felix B. Horn and
Adam Wagner,
by Miller R. Lane
Atty

UNITED STATES PATENT OFFICE.

FELIX B. HORN AND ADAM WAGNER, OF CEDAR FALLS, IOWA, ASSIGNORS TO WAGNER MANUFACTURING COMPANY, OF CEDAR FALLS, IOWA, A CORPORATION.

SHEET-METAL WHEEL.

1,078,581.　　　　Specification of Letters Patent.　　Patented Nov. 11, 1913.

Application filed June 15, 1911. Serial No. 633,243.

*To all whom it may concern:*

Be it known that we, FELIX B. HORN and ADAM WAGNER, citizens of the United States, residing at Cedar Falls, in the county of Blackhawk and State of Iowa, have invented a new and useful Improvement in Sheet-Metal Wheels, (Case 2,) of which the following is a specification.

The object of our invention is to provide a sheet metal wheel comprising but few parts in its construction, and possessing minimum weight with maximum mechanical rigidity.

In the accompanying drawings Figure 1 is a side elevation of a wheel embodying our invention; Fig. 2 is an enlarged cross-sectional view on line 2—2 of Fig. 1. Fig. 3 is a side view of the hub of the wheel, the front section of the wheel being removed to show the spacing spider in the hub; Fig. 4 is a view similar to Fig. 2 showing a modified form of spacing spider; and Fig. 5 is a side elevation of the hub portion of the wheel having the spacing spider of Fig. 4, the front section being shown removed to show the spider more clearly.

The wheel of our invention consists of two complementary halves or sections indicated, as a whole, by A and B. These sections are formed out of sheet metal and each comprises a hub portion 1, a plurality of spoke members 2, a flat annular portion 3 in which the outer ends of the spoke members terminate, and a tread portion 4. The two halves of the wheel meet in a central plane C which is perpendicular to the axis of the wheel. The walls of the hub portions 1 are substantially parallel and form an annular hub chamber H. The spoke members 2 are concave in form and have straight edges which come together in the common meeting plane C. When the parts are assembled, the spoke members 2 form spokes which are elliptic in cross-section. The sides of the spoke members 2 converge gradually toward the outer edges to a point 5 from which they converge suddenly at 6 to the meeting point 7 which lies in the plane C. From the points 8 at the outer end of the flat annular portion 3, the metal of the sections diverges outwardly at 9 and then turns inwardly at 10 to form the flat tread rim. When we say that the two halves or sections of the wheel meet in the common plane C, it is to be understood that we are referring to the illustrations in the drawing where the parts are shown fitting together perfectly. In the actual construction of the wheel it is rare that such a perfect fit is obtained and we wish to have it understood that the two halves of the wheel need only fit together as closely as the working of the sheet metal permits to form a wheel embodying our invention. Suitable fastening devices such as bolts 11 pass through the flat annular portions 3. It will be observed that these portions are of considerable area and that in the assembled wheel they form a connection of double thickness between the spokes and the tread rim of the wheel.

In the hub chamber H is located a spacing spider for holding the walls of the hub chamber apart. In Figs. 2 and 3 the spider indicated, as a whole, by S comprises an inner ring 12 and an outer ring 13 connected together by the portions 14, the ring being thus separated by elongated apertures 15. The substantially parallel walls of the hub portions 1 are provided with openings 16 around which extend annular recesses 17 formed by offsetting the metal of the hub portions. The ends of the inner ring 12 project into the recesses 17 to assist in holding the spider firmly in place. The outer ring 13 of the spider projects into the hub chamber 8 a considerable distance, so that a large bearing surface is presented to the walls of the hub chamber. Suitable fastening devices such as rivets 18 pass through the hub portions 1 and the apertures 15 of the spider, for rigidly clamping the hub portion against the spider rings. A bushing 19 extends through the hub openings and the spider. Sheet metal caps 20 engage the ends of the bushing 19 to prevent the same from working sidewise. The caps 20 are provided with outer flanges 21 which lie flat against the walls of the hub chamber and through which the fastening rivets 18 pass. The caps are provided with openings 22 in axial alinement with the opening of the bushing 19.

In the modification shown in Figs. 4 and 5 the spider indicated, as a whole, by S' comprises an inner ring 12' and an outer ring 15' connected together by the portions 14'. The two rings are thus separated by the apertures 15'. The spider S' is cast integral with the solid hub 23 for receiving the shaft of the wheel. The hub 23 is at its ends provided with an annular shoulder 24 formed on the ridges or corrugations 25. The caps 20 abut around their openings against the shoulders 24 so as to lie flush with the outer ends of the hub 23, thereby giving the wheel a neat and finished appearance.

If desired a reinforcing band consisting of a welded rod or wire 26 may be inserted in the tread chamber 27 formed by the portions 9 and 10 of the wheels sections.

Having thus described our invention, what we claim as new and desire to secure by Letters Patent of the United States is:

1. A sheet metal wheel consisting of two complementary halves or sections which comprise each a hub portion, spoke members with spaces between and a tread portion, the walls of the hub portions forming an annular hub chamber, fastening devices passing through the two wheel sections near the outer periphery thereof, a spider arranged in the hub chamber to hold the hub portions spaced apart, said spider consisting of an inner ring and a complete outer ring connected together to present two annular bearing surfaces to the walls of the chamber, there being apertures provided between the two rings, a bushing extending through the hub openings within the spider, and fastening devices passing through the hub portions and the apertures in the spider for rigidly clamping the hub portions against the spider.

2. A sheet metal wheel consisting of two complementary halves or sections which comprise each a hub portion, spoke members and a tread portion, the walls of the hub portions forming an annular chamber, fastening devices passing through the two wheel sections near the outer periphery thereof, a spider arranged in the hub chamber to hold the hub portions spaced apart, said spider consisting of an inner ring and an outer ring connected together to present two annular bearing surfaces to the walls of the hub chamber, there being apertures provided between the two rings, a bushing extending through said spider, retaining caps on the outside of the hub portions which engage the ends of the bushing and clamp it in place, said caps being provided with openings in axial alinement with said bushing, and fastening devices passing through said caps, said hub portions and the apertures in the spider for rigidly clamping the hub portions against the spider and securing the caps in place against the ends of the bushing.

3. In a sheet metal wheel consisting of two complementary halves or sections and comprising each a hub portion, spoke members and a tread portion, the walls of the hub portions being substantially parallel and forming an annular hub chamber, fastening devices passing through the sections near the outer periphery thereof, an apertured spacing member arranged between the parallel walls of the hub chamber and presenting considerable bearing surface to said walls, a bushing extending through the hub openings, retaining caps for said bushing, and fastening devices passing through said hub portions and the apertures in said spacing member to clamp the hub portions rigidly against the spacing member and to clamp said caps against said bushing.

4. In a sheet metal wheel consisting of two complementary halves or sections and comprising each a hub portion, spoke members and a tread portion, the walls of the hub portions being substantially parallel and forming an annular hub chamber, fastening devices passing through the sections near the outer periphery thereof, an apertured spacing member arranged between the parallel walls of the hub chamber and presenting two annular bearing surfaces to said walls, a bushing extending through the hub openings, retaining caps on the outside of the hub portions for engaging the ends of the bushing, said caps being provided with openings in axial alinement with said bushing, and fastening devices passing through said caps, said hub portions, and the apertures in the spacing member for rigidly clamping the hub portions against the spacing member and clamping the caps in place against the ends of the bushing.

5. A sheet metal wheel consisting of two complementary halves or sections which comprise each a hub portion, spoke members and a tread portion, the walls of the hub portions forming an annular hub chamber, said walls being provided with shaft openings and annular recesses extending around said openings, fastening devices passing through the two wheel sections near the outer periphery thereof, a spider arranged in the hub chamber to hold the hub portions spaced apart, said spider consisting of an inner ring and an outer ring connected together to present two annular bearing surfaces to the walls of the hub chamber, there being apertures provided between the two rings, the inner ring extending at its ends into said recesses, a bushing extending through the hub openings, and fastening devices passing through the hub portions and the apertures in the spider for rigidly clamping the hub portions against the spider.

6. A sheet metal wheel consisting of two complementary halves or sections which comprise each a hub portion, spoke members and a tread portion, the walls of the hub portions forming an annular hub chamber, said walls being provided with shaft openings and annular recesses extending around said openings, fastening devices passing through the two wheel sections near the outer periphery thereof, a spider arranged in the hub chamber to hold the hub portions spaced apart, said spider consisting of an inner ring and an outer ring connected together to present two annular bearing surfaces to the walls of the hub chamber, there being apertures provided between the two rings, the inner ring extending at its ends into said recesses, a bushing extending through the hub openings, retaining caps on the outside of the hub portions engaging the ends of the bushing to clamp it in place, said caps being provided with openings in axial alinement with said bushing, and fastening devices passing through said caps, said hub portions and the apertures in the spider for rigidly clamping the hub portions against the spider and securing the caps in place against the ends of the bushing.

In witness whereof, we hereunto subscribe our names this 2nd day of June, 1911.

FELIX B. HORN.
ADAM WAGNER.

Witnesses:
W. L. MARCH,
W. R. IRWIN.